W. C. TYLER.
APPARATUS AND METHOD FOR FORMING INNER TUBES FOR PNEUMATIC TIRES.
APPLICATION FILED AUG. 8, 1918.
1,332,779.
Patented Mar. 2, 1920.
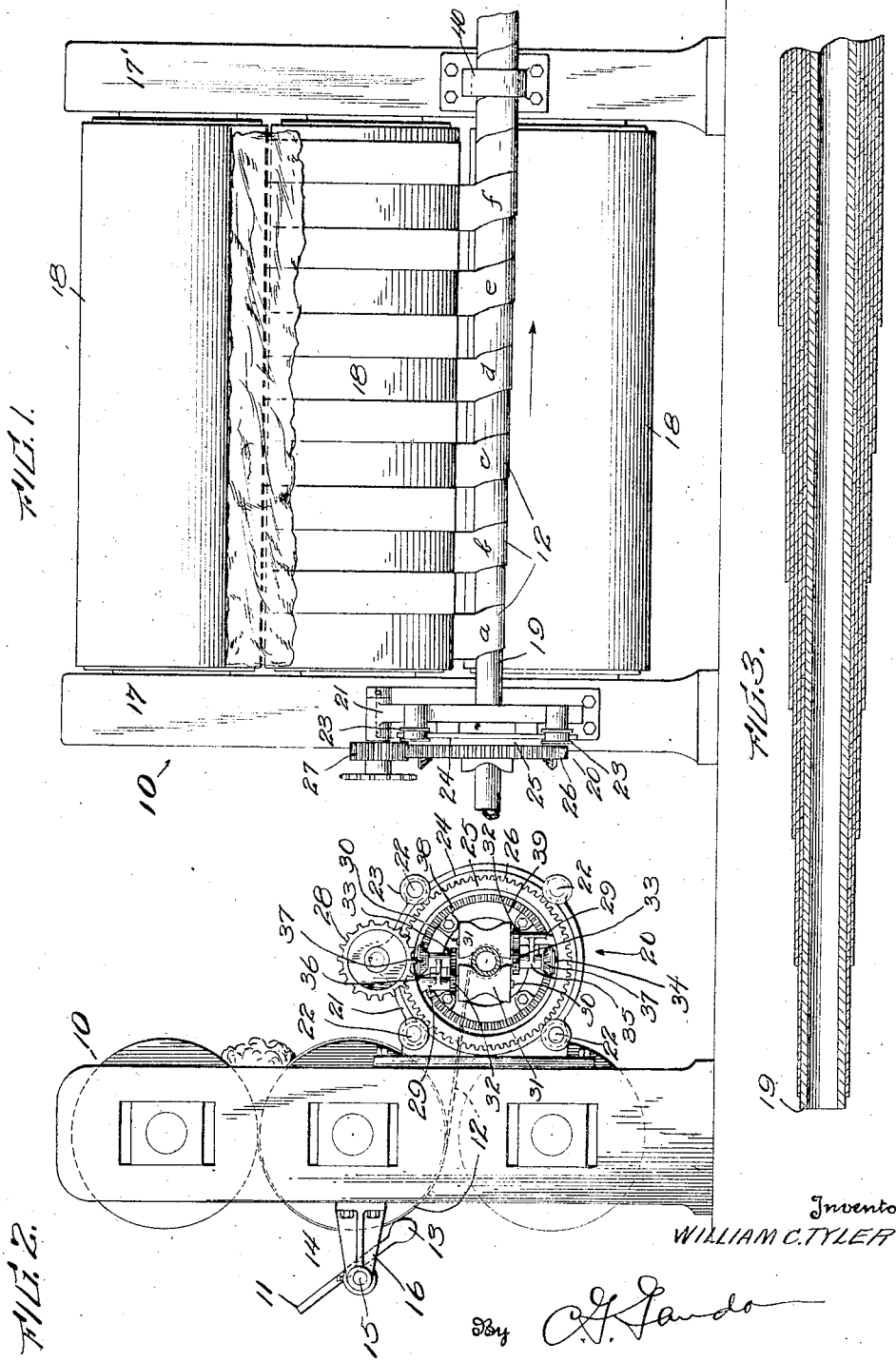
Inventor
WILLIAM C. TYLER

UNITED STATES PATENT OFFICE.

WILLIAM C. TYLER, OF RACINE, WISCONSIN, ASSIGNOR TO THE GOODYEAR TIRE & RUBBER COMPANY, OF AKRON, OHIO, A CORPORATION OF OHIO.

APPARATUS AND METHOD FOR FORMING INNER TUBES FOR PNEUMATIC TIRES.

1,332,779.                Specification of Letters Patent.        Patented Mar. 2, 1920.

Application filed August 2, 1918. Serial No. 248,880.

*To all whom it may concern:*

Be it known that I, WILLIAM C. TYLER, a citizen of the United States, residing at Racine, in the county of Racine and State of Wisconsin, have invented new and useful Improvements in Apparatus and Methods for Forming Inner Tubes for Pneumatic Tires, of which the following is a specification.

My present invention relates to an apparatus and method for use in the construction of inner tubes for pneumatic tires.

The principal object of my present invention is to provide an apparatus for building inner tubes of such a nature that it may be applied directly to a calender, and the inner tubes built up from laminations formed in a continuous manner and directly wound upon a continuously fed series of mandrels.

The above and additional objects of a similar nature, may be accomplished by such means as are illustrated in the accompanying drawings, described in the following specification, and then more particularly pointed out in the claims which are appended hereto and form a part of this application.

With reference to the drawings wherein there has been illustrated a preferred embodiment of the invention as it is reduced to practice, and throughout the several views of which similar reference numbers designate corresponding parts:

Figure 1 represents diagrammatically a front view of a calender with my improved apparatus mounted thereon;

Fig. 2 represents an end view of the same; and

Fig. 3 represents a sectional view of one end of a mandrel illustrating the starting of the laminations of rubber upon the mandrel.

In the drawings, the numeral 10 designates the calender as a whole; 11 the knives mounted thereon to produce a series of narrow strips of stock of equal width; and 12 the strips of stock.

The calender 10 may be of the usual or any approved construction.

The knives 11 may be of any suitable type, those shown being provided with rounded edged portions 13 at the ends of the bars 14, which latter are adjustably mounted on the rod 15 which is in turn mounted in brackets 16 attached to the rear face of the side supports 17 and 17' of the calender 10.

The mandrels 19 may be of the usual or any suitable construction which permits of detachably joining adjacent ends in longitudinal alinement.

In carrying out my present invention I arrange on the calender 10 suitable mechanism 20, one form being illustrated in Figs. 1 and 2, for rotating the mandrels 19 and simultaneously moving them parallel to the calender rolls 18, so that the strips 12 can be wound in such a manner as to form a plurality of layers of material on the mandrels.

The mechanism 20 is constructed as follows:

A bracket or frame 21 is attached to the side support 17 and has thereon the stud shafts 22 for the grooved rollers 23. Into the latter extends an annular flange 24 provided on one side of the ring 25 the opposite side of which is provided with spur teeth 26 in mesh with the spur pinion 27 rotatably mounted in the bearing bracket 21 and suitably connected to the driving sprocket wheel 28. The toothed ring 25 carries bearings 29 for stud shafts 30 to which are attached the bight rollers 31 which normally contact with the mandrels 19. On the stud shafts 30 are mounted the spur wheels 32 which mesh with spur wheels 33 on shafts 34 arranged on bearings 35 attached to the bearings 29 by the cross arms 36. Bevel pinions 37 on the shafts 34 mesh with bevel teeth 38 provided on a ring 39 which is stationarily mounted on the bracket 21.

On the side support 17' of the calender 10 is mounted a bearing member 40 adapted to support and guide the mandrels 19.

From the foregoing detailed description, the construction and operation of the apparatus will be apparent to those skilled in the art. It will be understood that the mandrels 19 are rotated in consequence of their being turned with the rollers 31 when the ring 25 is rotated. Also, it will be seen that when the rollers 31 are turned bodily, due to the rotation of the ring 25, they act to effect longitudinal movement of the mandrels 19 by reason of said rollers being rotated on their axes in consequence of their being operatively connected to the stationary ring 39. In starting the winding on the first mandrel 19 of the strips of material 12, the strip indicated at (*a*) is wound on the mandrel to form the inner layer or lamination; the strip indicated at (*b*) is wound on the first layer to lap the convolutions of the strip (a), and then the strips (c), (d), (e) and (f) are successively wound on each other to have succeeding strips overlap the convolutions of preceding strips and to form the layers or laminations of material as seen in Fig. 3. It will be understood that after starting the winding of the layers of material on the first mandrel, the winding of the layers of material to form a tubular covering on a series of detachably connected mandrels can be continuously performed. After the strips of material have been wound on the mandrels, the material is cut transversely around the mandrels at the junction of adjacent mandrels, and the separate mandrels with the material thereon are prepared for vulcanization in the usual or any approved manner.

What I claim is:

1. An apparatus for forming an inner tube on a mandrel, comprising the combination with a calender, of a frame on said calender, a pair of bight rollers carried upon said frame and supporting the mandrel, means for rotating said rollers about a common axis to rotate the mandrel, and means between the rollers and the frame operable simultaneously with said first means for rotating the rollers about their own axes, whereby the mandrel is moved longitudinally.

2. An apparatus for forming an inner tube on a mandrel comprising the combination with a calender, of a frame on said calender, a pair of bight rollers carried upon said frame and supporting the mandrel, means carried upon the frame for rotating said bight rollers about a common axis to rotate the mandrel, means between the rollers and the frame operable simultaneously with said first means for rotating said rollers about their own axes, whereby the mandrel is moved longitudinally, and means upon the calender for guiding the mandrel in its longitudinal movement.

3. An apparatus for forming an inner tube on a mandrel, comprising the combination with a calender, of a frame on said calender, a ring rotatably mounted on said frame, rollers carried by said ring and adapted to contact with the mandrel, a stationary ring, and operative connections between said stationary ring and said rollers.

4. An apparatus for forming an inner tube on a mandrel, comprising the combination of a calender, a bracket mounted on said calender, a ring mounted rotatably on said bracket, rollers carried by said ring and adapted to contact with the mandrel, a toothed ring stationarily mounted on said bracket, and means operatively connected with the stationary toothed ring for rotating said rollers to move the mandrel longitudinally of its axis.

5. The method of forming an inner tube for pneumatic tires, which comprises the following steps: (1) cutting a sheet of the tube material into a series of strips arranged for feeding in parallel paths; (2) rotating a mandrel and simultaneously moving the mandrel transversely of the paths along which the strips of material are fed; (3) connecting the first strip to the mandrel; and (4) connecting the other strips of material in succession to the strips wound on the mandrel so that the strips of material are wound on the mandrel in layers to form the tube.

6. The method of forming an inner tube for pneumatic tires, which comprises passing rubber material between the rolls of a calender to form a sheet of tube material, cutting the sheet of material to form a series of strips of the material on one roll of the calender, rotating a mandrel and simultaneously moving the mandrel along a path parallel to the axis of the roll, and passing the strips of material from the roll onto the mandrel in such manner that the succeeding strips are wound over preceding strips and form a series of layers of the material on the mandrel.

7. A method of forming an inner tube for pneumatic tires which comprises: calendering a sheet of inner tube material, cutting said sheet into a number of parallel strips as the sheet emerges from the calender, feeding a mandrel across the paths along which the strips are withdrawn from the calender, the mandrel being simultaneously rotated with the transverse movement relatively to the strips, and attaching the strips to the mandrel whereby the strips are wound helically around the mandrel in such manner that the successive strips, commencing with the strip located at the advance portion of the mandrel, are superimposed one upon the other.

In witness whereof, I have hereunto signed my name in the presence of two subscribing witnesses.

WILLIAM C. TYLER.

Witnesses:
  VIRGINIA C. PEIL,
  LIBBIE A. POTORSKY.